Sept. 18, 1962 A. E. HALLEN 3,054,512
LIFTING APPARATUS COMPRISING A CARGO BOOM HAVING TWO TOPPING
LIFTS WHICH, IN A HORIZONTAL PLANE, FORM AN ANGLE
Filed Nov. 7, 1960 8 Sheets-Sheet 1
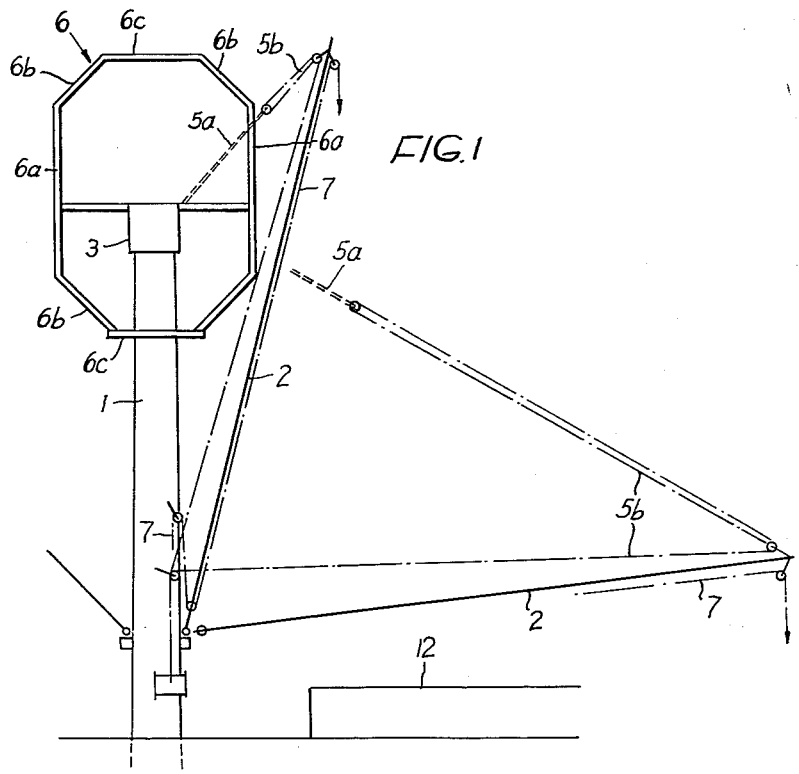
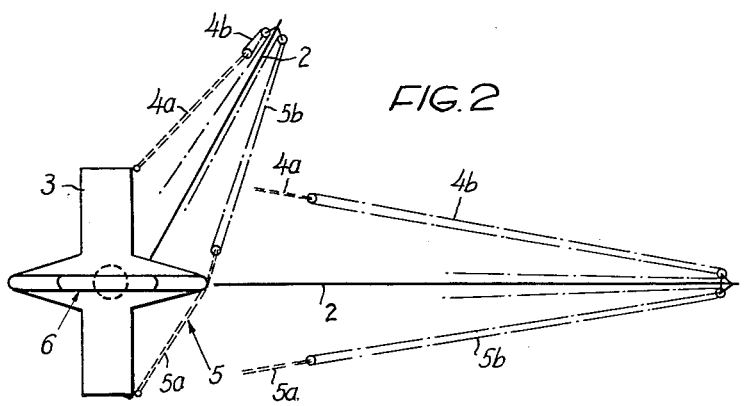

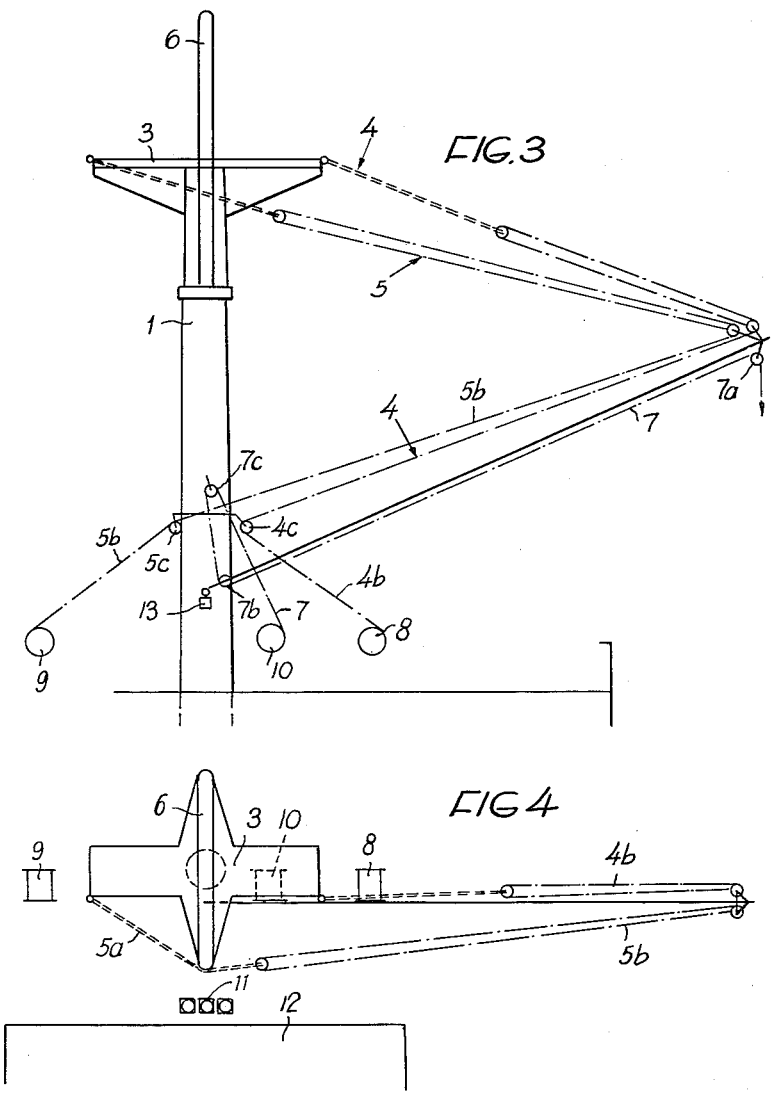

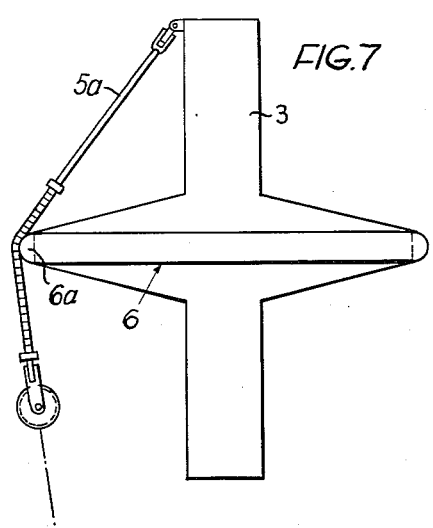
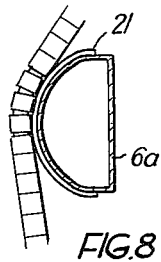
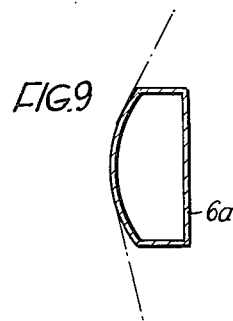
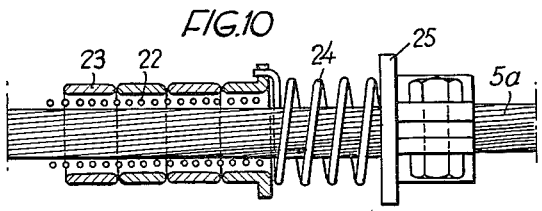
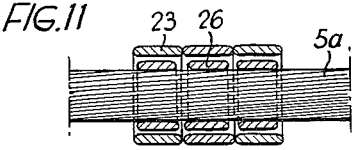
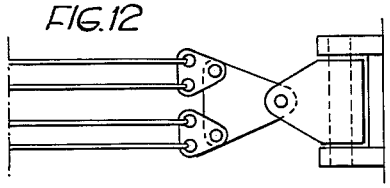

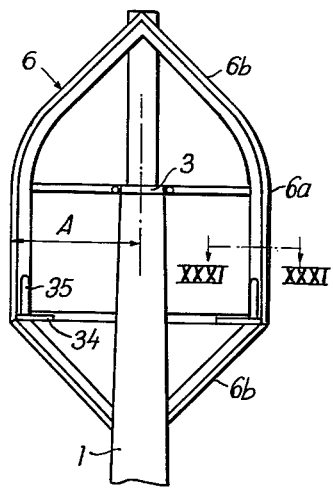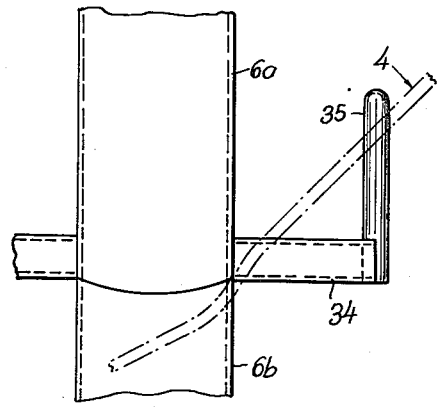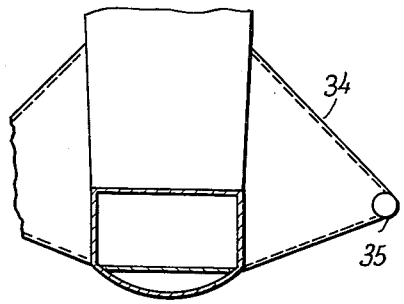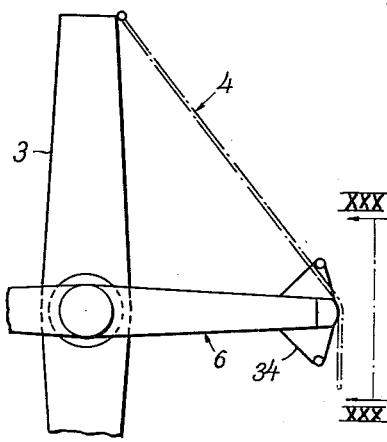

United States Patent Office 3,054,512
Patented Sept. 18, 1962

3,054,512
LIFTING APPARATUS COMPRISING A CARGO BOOM HAVING TWO TOPPING LIFTS WHICH, IN A HORIZONTAL PLANE, FORM AN ANGLE
Alf Eskil Hallen, Odinsgatan 23, Goteborg, Sweden
Filed Nov. 7, 1960, Ser. No. 67,773
Claims priority, application Sweden Nov. 21, 1959
9 Claims. (Cl. 212—3)

The present invention relates to a lifting apparatus preferably for cargo handling on board ships and comprising a cargo boom whose upper end is connected to a mast or the like by means of two topping lifts which, in a horizontal plane, form an angle with each other. It has been previously proposed to arrange the connection point for one topping lift on an athwartships outrigger in substantially the same athwartship plane as the boom step at the lower end of the boom and arrange the connection point of the other topping lift on a fore-and-aft outrigger so that the latter connection point lies in an athwartships plane nearer to the hold opening. In this way it is possible to swing the cargo boom to and fro over the ship's side merely by shortening and lengthening of the latter topping lift. In order to render topping of the boom possible, it has also been proposed to make the fore-and-aft outrigger swingable in the vertical plane. This construction can be further developed by using outriggers which are swingable both in a horizontal and vertical direction, but this makes the arrangement more complicated.

The present invention relates to an apparatus which gives the same maneuverability as the most advanced of the above arrangements but which is particularly simple since swingable outriggers are not used. The apparatus according to the invention is characterized mainly in that between the points of connection of the two topping lifts to the mast there is mounted on the mast a vertical cam which projects between the topping lifts and over which one of the topping lifts is bent when the boom is swung outwardly in a direction towards a position parallel with a vertical plane through the connection points.

Figure 5:
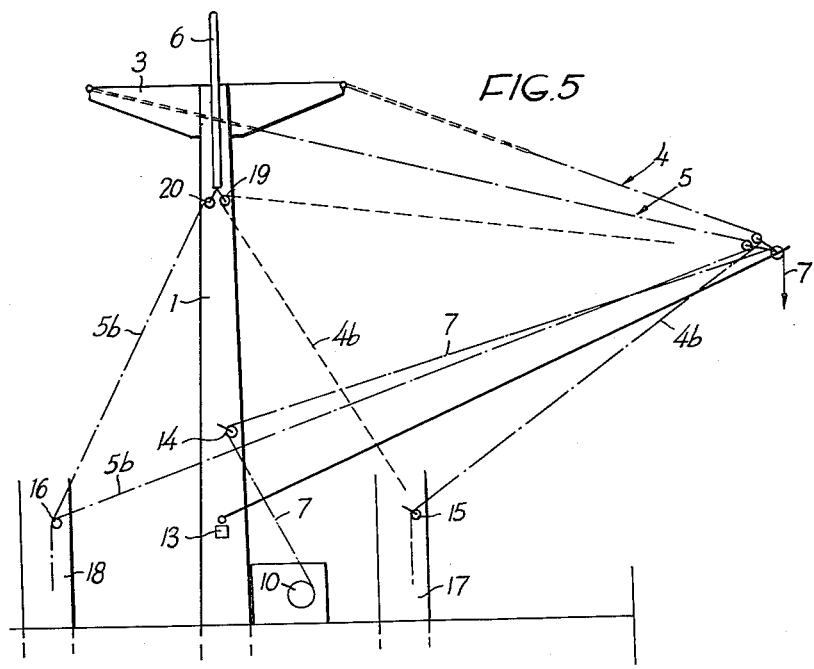
Figure 6:
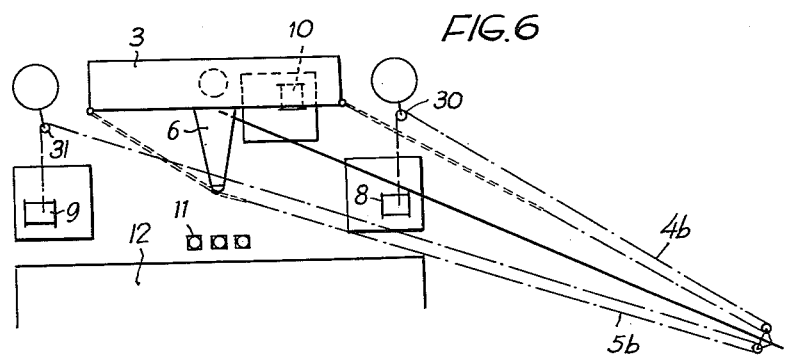
Figure 13:
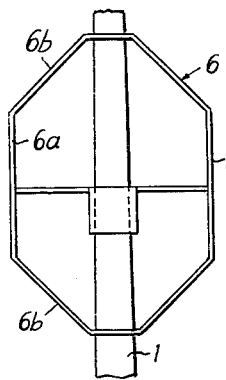
Figure 18:
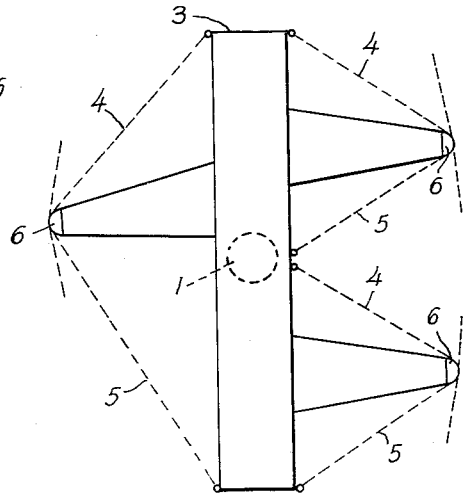
Figure 19:
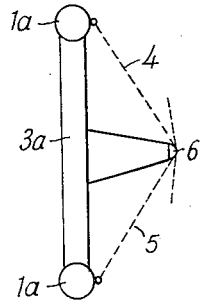
Figure 20:
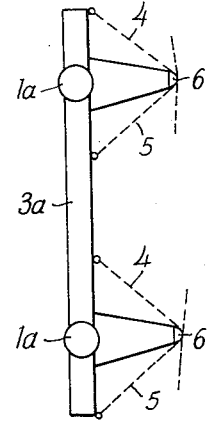
Figure 17:
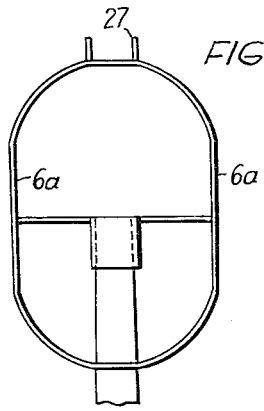
Figure 21:
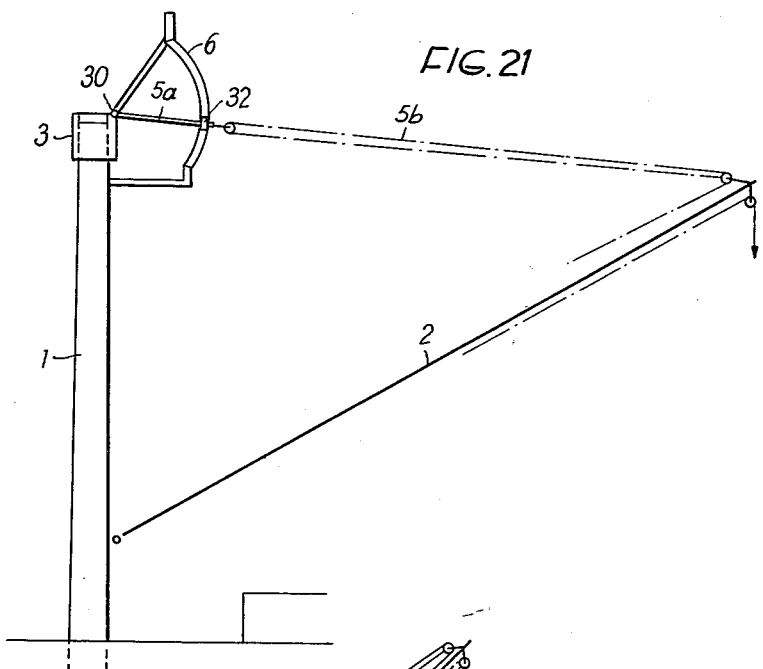
Figure 22:
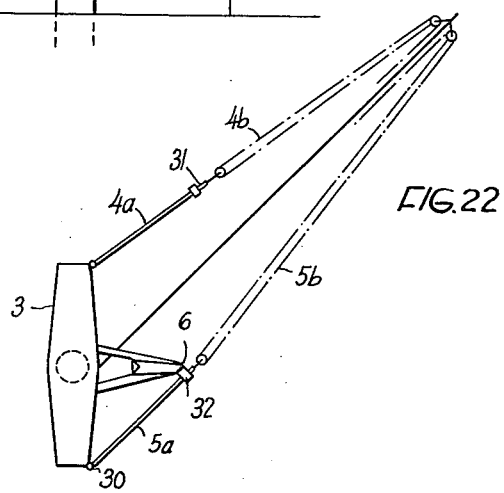
Figure 23:
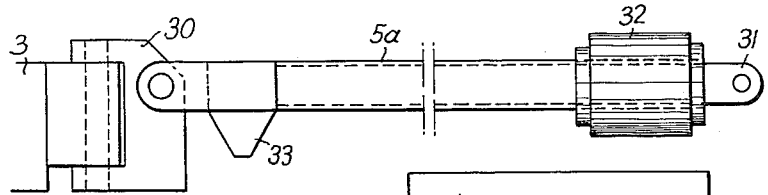
Figure 24:
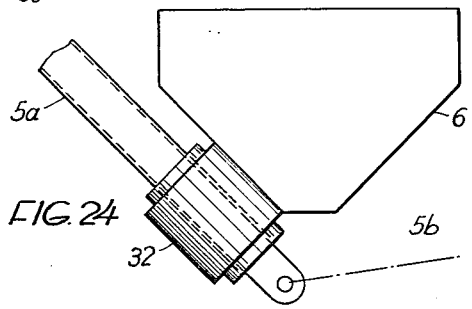
Figure 25:
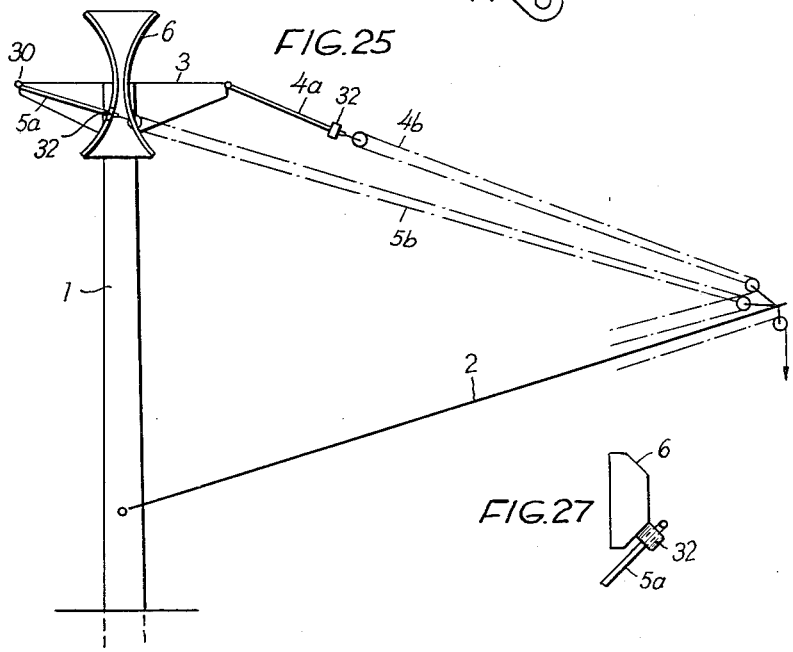

The invention will now be described with reference to the embodiments shown in the enclosed drawings. In these FIGURE 1 is a side view and FIGURE 2 a view from above of a device constructed according to the invention and mounted on a ship's mast, and the cargo boom is shown in two different positions. FIGURE 3 is a view from in front and FIGURE 4 a view from above of the same mast with the boom swung completely out over the side of the ship. FIGURES 5 and 6 show in a similar manner to FIGURES 3 and 4 a similar device with a slightly different run of ropes. FIGURES 7–12 show on a larger scale the method of operation of and different forms of members forming part of the devices according to FIGURES 1–6 while FIGURES 13–17 show different embodiments of a cam forming a part of the same devices. FIGURES 18–20 show different ways of locating such cams. FIGURES 21 and 22 show in side elevation and plan a ship's mast having a device according to the invention, but constructed slightly differently, while FIGURES 23 and 24 show certain details of this construction. FIGURE 25 shows a view from in front of yet another embodiment of the invention, and FIGURES 26 and 27 parts of this embodiment. FIGURES 28 and 29 show in elevation and plan respectively a construction which may be said to be a modification of the embodiment of FIGURE 13. FIGURE 30 is a detail view on the line XXX—XXX in FIGURE 29 and FIGURE 31 a section on the line XXXI—XXXI in FIGURE 28.

In FIGURES 1–4 reference 1 denotes a ship's mast, which in known manner is fitted with a swingable cargo boom 2. The mast carries on its upper part a transverse outrigger 3, to which are secured two topping lifts 4 and 5 which form an angle with each other in the horizontal plane. Each topping lift consists of two parts, namely an inner part 4a and 5a, respectively, these inner parts being connected to the outer ends of the outrigger 3, and an outer part 4b and 5b, these outer parts connecting the inner parts with the upper end of the boom.

The inner parts 4a and 5a have a constant length and are in the example shown flexible and may consist of lengths of cable, chains or the like. The outer parts 4b and 5b of the topping lifts have, on the other hand, an adjustable length and consist of lines connected to winches in the usual manner, by means of which the cargo boom 2 can be controlled.

At the upper end of the mast 1 a frame 6 is fixed, which forms a cam that projects between the two topping lifts 4 and 5. Since the mast according to FIGURES 1–4 is considered to be located between two hatch openings and supports a boom for each hatch opening, the frame 6 is symmetrical with respect to an athwartships plane through the mast and projects longitudinally in both directions from it. In the construction shown in the figures the frame 6 is built of two vertical bars 6a, four inclined bars 6b and two horizontal bars 6c.

The cargo line 7 runs from a block 7a at the upper end of the boom along the underside of the boom to the lower end, where it passes through the boom and over a lead block 7b arranged in it, over a block or the like 7c arranged higher up on the mast and from the latter down to a winch 10 located on the deck. The lines 4b and 5b pass along the upper side of the boom down to blocks 4c and 5c arranged on the mast, whence they extend to winches 8 and 9 located on the deck. FIGURE 4 shows how the control members 11 for the three winches 8, 9 and 10 are located immediately adjacent the hold opening 12.

In FIGURES 1 and 2 the cargo boom 2 is shown in two different positions. In the one position the boom extends longitudinally over the cargo hold opening 12, while in the other position it is swung out towards the side of the ship and is fairly highly topped. This latter position is achieved by considerably shortening the lines 4b and 5b in comparison with the first position, the line 4b being shortened the most. As shown in FIGURE 2 the topping lift part 5a has in this second position come into contact with the cam's or frame's 6 vertical bar 6a. If in the second position the topping lift part 5b is lengthened, the boom 2 will by itself swing further out towards the side of the ship, until it lies in the same vertical plane as the boom step 13 of the boom 2 and in the connection point of the topping lift 4 with the outrigger 3. This plane is in the shown example substantially perpendicular to the fore-and-aft line of the ship. From the perpendicular swinging position so achieved the boom can, by lengthening of both topping lifts 4 and 5, be lowered while swinging in the vertical plane to the position shown in FIGURE 4.

It can be seen from FIGURE 4 that the topping lift 5, owing to the cam 6, even when swung out to the maximum extent possible, forms such a large angle with the boom that this can be swung back over the ship merely by shortening the topping lift 5. When swinging inwardly in this way, the top of the boom describes an upwardly rising three-dimensional curve, whereby the contact point between the part 5a of the topping lift and the vertical cam bar 6a moves upwardly. Such a movement of the contact point also occurs during simple raising and lowering of the boom in its outwardly swung position as well as with certain combined movements of the boom. Irrespective of the direction of outward swinging of the boom the cam 6 ensures that the boom can again be swung in over the ship even if the boom should be swung out over the side of the ship 90° or more.

In the embodiment according to FIGURES 5 and 6 the mast carries a cam which projects in only one direction. In this case the hoist line 7 passes over the boom 2 to a lead block 14 secured to the mast, and thence to its drum 10. Two different alternatives for the lead of the lines are shown for the topping lift parts 4b and 5b. In the one case said topping lift parts run from the upper end of the boom to lead blocks 15 and 16, which are located on ventilators 17 and 18 and from the latter they pass to the winches 8 and 9, which in this case are located fairly close to the hatch opening 12. The topping lift parts may however alternatively be led to lead blocks 19 and 20 placed fairly high up on the mast, and thence via lead blocks 15 and 16 to the winches 8 and 9.

It should be observed that the topping lift parts 4b and 5b between the outer ends of the topping lifts parts 4a and 5a and the top of the boom may comprise simple lines but preferably there is a multi-sheave block for each topping lift. For the sake of simplicity the individual ropes running from the top of the boom to the winches have been designated by 4b and 5b despite the fact that these reference numerals signify in the first place possibly multi-part topping lifts between the top of the boom and the outrigger 3.

In FIGURE 7 there is shown how the flexible topping lift part 5a adjacent the outrigger 3 is provided with a cover extending over a length which may come into contact with the cam 6. The vertical bar 6a of the latter may be constructed according to FIGURES 8 and 9, which are sections through the bar. The bar 6a can thus advantageously have a tubular section, whereby its working surface may be more or less curved and possibly provided with a layer 21 of wear-resistant material.

In FIGURES 10 and 11 two different embodiments of covering for the inner parts of the topping lifts are shown. The topping lift part proper comprises a cable or a steel wire rope, and round this there is a fairly loosely wound steel wire 22, which does not prevent the flexing of the cable. On the wound part short sleeves 23, with suitably rounded end edges, are threaded, and these sleeves are held pressed together by a coil spring 24, which abuts against an abutment fixed in a suitable manner to the cable. The sleeves 23 form rollers, which protect the cable from wear when the topping lift part moves along the bar 6a.

In the embodiment according to FIGURE 11 the steel wire 22 has been replaced by short pipe lengths 26, which are secured to the cable in a suitable manner.

The sleeves 23 can be of any suitable material, such as steel, brass or a plastic material such as nylon, which can withstand the pressure which occurs.

Instead of a cable or steel wire rope a chain may be used as the inner part of the topping lift, which advantageously can be made of roller-carrying links for reduction of the friction during movement along the bar 6a. It is also possible for the inner topping lift part to be made of a plurality of lines, as is schematically shown in FIGURE 12.

Figure 14:
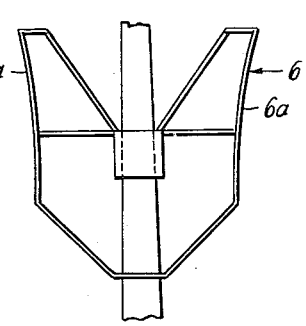

In FIGURES 13–17 various constructions of the frame 6 are shown. The active part of the frame is constituted by the vertical bar 6a, which is preferably straight but which, without inconvenience, may be made somewhat bent, as shown in FIGURE 14. In the embodiments according to FIGURES 15 and 17 there are studs 27 arranged on the frame, and their purpose is to limit the movement of the topping lift towards the mast if the lift for some reason, when the boom is being topped, should tend to slide beyond the upper end of the bar 6a.

Figure 15:
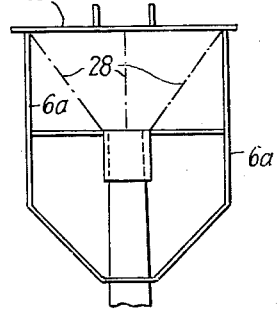
Figure 16:
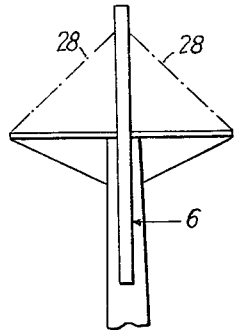

FIGURES 15 and 16 show the same construction in two different views. From both these figures it is clear that the frame can be stayed in the athwartships direction by stays 28, which reinforce the connection, constructed in some suitable manner, between the frame and the mast.

FIGURES 18–20 show plan views of three different arrangements of the device according to the invention. In FIGURE 18 the athwartships outrigger 3 carries on one side two cams 6 for booms arranged in pairs whilst on the other side there is a single asymmetrically placed cam for a central cargo boom. As a result of the unsymmetrical location it is possible to raise and lock the cargo boom in a vertical position. In the construction according to FIGURE 19 there is no mast and instead there are two derrick posts 1a connected at their upper ends by means of a transverse beam 3a, which carries the cam 6 for a centrally located cargo boom. Derrick posts with a transverse beam are also shown in FIGURE 20, according to which the transverse beam supports two cams 6 for two booms arranged in pairs.

In the embodiments described above the inner parts 4a and 5a of the topping lifts have been assumed to be flexible. Below two embodiments will be described in which said topping lift parts are constructed as substantially rigid rods.

In the embodiments according to FIGURES 21–24 the topping lift part 5a consists of a rod, which by means of a universal joint 30 is articulately connected to the outrigger 3. At its free end the rod 5a is provided with an eye 31 for connection to the topping lift part 5b and with a rotatable roller 32, which is arranged to roll on the cam 6. An abutment 33 is arranged adjacent the joint 30, and it cooperates with a vertical surface on the universal joint 30 and serve as a stop and limits the downward swinging of the rod 5a.

As shown in FIGURE 21 the cam 6 is made of a bar curved in the fore-and-aft plane. If this bar is arcuately curved the rod 5a during its movement in contact with the bar follows the surface of a circular cone having a transverse axis.

FIGURE 24 shows a section through the cam 6 and how the roller 32 contacts the cam. In order that the rolling movement should be smooth, the rolling surface on the cam 6 and the surface of the roller 32 should form conical surfaces having their apices in the joint of the rod 5a on the outrigger 3.

When the cargo boom in its outwardly swung position is swung upwardly or downwardly the roller 32 rolls along the bent bar 6. Since the eye 31 lies very close to the roller 32 the rod 5a is not subject to any appreciable bending moment. The stop abutment 33 is so arranged that the rod 5a cannot be swung downwardly beneath the lower end of the bar 6 but is arrested in a position, which corresponds to the direction of the topping lifts when the cargo boom is lowered towards the deck of the ship. At its upper part the bar 6 terminates in a vertical part, which prevents the roller from leaving the bar in this direction.

Figure 27:
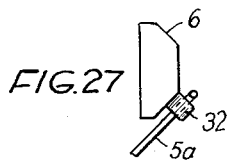
Figure 26:
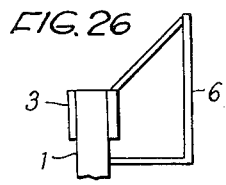

In the embodiment according to FIGURES 25–27 the topping lift part 5a consists of a rigid rod with a roller 32. In this case however the cam 6 having two parallel roller paths is replaced by a double cam with two roller paths bent in the athwartships plane, one for each topping lift. If the roller paths are arcuately bent the rod 59 moves along the surface of a circular cone having a fore-and-aft axis. Apart from this the figures do not require any further description.

Between the two embodiments shown in FIGURES 21 and 25, several intermediate forms, in which the roller paths are three-dimensional curves, can be visualized. These can be so constructed that the rigid rods describe arbitrary conical surfaces during their movements or even move in a vertical plane or a substantially vertical plane.

In the embodiment according to FIGURES 28–31, horizontally projecting plates 34, which support studs 35, are arranged at the lower ends of the bar parts 6a. When the cargo boom is swung out over the ship's side and is lowered towards the horizontal position in order to increase its span, it can happen that the winch operator, owing to lack of attention, drives the winch for the cam-contacting topping lift too long so that the topping lift becomes slack. It is hereby caught by the stud 35 so that it automatically assumes its correct position as soon as it is again shortened. If the boom on the other hand is topped when in an outwardly swung position the topping lift slides up on the upper inclined bar part 6b over the gently bent transfer part between the parts 6a and 6b.

In all cases, the points of attachment of the topping lifts on the athwartship outrigger 3 are preferably situated at a height above the boom step (boom needle), which amounts approximately to 60% of the length of the boom, that is the distance between the lower end of the boom and the points of connection of the topping lifts to the boom. Particularly in the construction according to FIGURES 28 and 29, it is convenient to choose the distance A between the centre of the mast and the outer edge on the bar part 6a in such a way that this distance corresponds to the sum of the distance between the boom step and the centre of the mast and about 1/10 of the length of the boom, while the distance between the points of connection of the two topping lifts on the transverse outrigger 3 approaches about 30% of the length of the boom. The length of the vertical bar part 6a may for example be about 15% of the length of the boom.

The invention is not limited to the above described and illustrated embodiments, but can be modified within the scope of the succeeding claims. For example, in the construction according to FIGURE 5 the lead blocks 15 and 16 can be secured to the legs of a bipod mast instead of to the ventilators 17 and 18. Other modifications, which do not need to be mentioned here, are also possible.

What I claim is:

1. A lifting apparatus comprising a mast, a cargo boom pivotally mounted at one end in a boom step secured to a support so as to be swingable vertically between a substantially horizontal position to a raised position as well as horizontally over a range of at least 90° in both directions from a central position, a two-armed outrigger secured to the upper portion of said mast and extending in opposite directions therefrom, two topping lifts adjustable to their lengths and extending between the free cargo boom end and the outrigger arm so as to form an angle with each other in a horizontal plane, a cam having a vertical active edge and being secured to the upper portion of the mast and projecting between the topping lifts in a plane containing the boom step and forming a right angle with a plane through the connection points of the topping lifts at the ends of the outrigger arms, each topping lift comprising two parts of which the inner one has a constant length such that it reaches the active edge of the cam when the boom is swung out towards an end position while the outer part has an adjustable length, said inner topping lift part being swingable in vertical direction in all positions of the boom within the horizontal swinging range of the latter, a hoist line depending from the free boom end and passing along the boom and separately operable winch means for said topping lifts and said hoist line.

2. An apparatus according to claim 1, characterized in that the inner part of the topping lift adjacent the mast is constituted by a flexible cable, chain or the like, which in the outwardly swung position of the boom extends beyond the cam, whose active edge is constituted by a bar or the like having a gently rounded cross-section.

3. An apparatus according to claim 2, characterized in that the inner flexible part of the topping lift is provided with a covering to reduce friction and wear during the movement of part of the topping lift in a vertical direction in contact with the cam.

4. An apparatus according to claim 3 characterized in that the inner flexible part of the topping lift is covered with fairly short sleeves threaded on to it and rotatably journalled on the part in question, said sleeves being arranged to roll on the cam when the topping lift moves in a vertical direction in contact with the cam.

5. An apparatus according to claim 1 characterized in that the outer adjustable part of the topping lift is constituted by a line connected with a winch, said line extending between the inner part of the topping lift and the upper end of the cargo boom, from which it runs down to the winch located on a platform, a ship's deck or the like.

6. An apparatus according to claim 5 characterized in that the topping lift line between the upper end of the cargo boom and the winch passes over a lead block or the like connected to the mast.

7. An apparatus according to claim 1 characterized in that the active edge of the cam is substantially straight and vertical.

8. An apparatus according to claim 1 characterized in that the inner part of the topping lift adjacent the mast is constituted by a substantially rigid rod, which adjacent the connection point with the outer part of the topping lift carries a roller, which is arranged to cooperate with a curved roller path on the cam.

9. A lifting apparatus according to claim 1 in which the inner topping lift part is connected to the outrigger by means of a universal joint comprising an element swingable about a horizontal pivot supported by a further element which in turn is swingable about a vertical pivot supported by the outrigger.

References Cited in the file of this patent

UNITED STATES PATENTS

| | | |
|---|---|---|
| 2,830,710 | Banks | Apr. 15, 1958 |
| 2,944,680 | Banks | July 12, 1960 |